UNITED STATES PATENT OFFICE 1,983,359

ULTRA VIOLET RAY TRANSMITTING GLASS

Kitsuzo Fuwa and Fujio Suzuki, Tokyo, Japan, assignors to General Electric Company, a corporation of New York No Drawing. Application October 25, 1932, Serial No. 639,528. In Japan November 14, 1931

2 Claims. (Cl. 106—36.1)

Our invention relates to glass and a method of manufacture thereof and more particularly to glass which will transmit ultra-violet rays.

Ultra-violet transmitting glasses have been made by mixing together very pure materials but difficulty has been encountered in preventing the batch from becoming contaminated during the melting. The high temperatures or longer heating periods that were required resulted in erosion of the melting pots with consequent contamination of the glass batch. The object of our invention is to provide a novel and easily performed method for producing a glass which will transmit ultra-violet rays.

According to our invention an oxalate and a fluoride are added to an ordinary glass composition and melted therewith. The resulting glass is not only clear, but the small amount of iron present in the materials is reduced to the ferrous oxide, in which form it does not materially affect the transmission of ultra-violet rays.

As an illustration of a satisfactory composition comprising our invention, we take the following ordinary glass composition:

| | Per cent |
|---|---|
| Silica | 73–80 |
| Alumina | 0– 3 |
| Lime | 7–14 |
| Magnesia | 0– 3 |
| Soda | 12–20 | and add thereto the following:

| | Per cent |
|---|---|
| Sodium fluoride | 1–5 |
| Ammonium oxalate | 1–5 |

The above materials are mixed together and melted. The glass made thereby is not only a good transmitter of ultra-violet rays, but it is also very durable against the effects of weathering.

What we claim as new and desire to secure by Letters Patent of the United States, is:

1. The method of manufacturing glass capable of transmitting ultra-violet radiation which comprises adding to the ordinary glass composition, one to five per cent of sodium fluoride and one to five per cent of ammonium oxalate.

2. A batch for the manufacture of ultra-violet transmitting glass comprising sodium fluoride and ammonium oxalate in addition to the materials ordinarily present in a glass batch.

KITSUZO FUWA.
FUJIO SUZUKI.